US010957049B2

(12) United States Patent
Hershkovich et al.

(10) Patent No.: US 10,957,049 B2
(45) Date of Patent: Mar. 23, 2021

(54) UNSUPERVISED IMAGE SEGMENTATION BASED ON A BACKGROUND LIKELIHOOD ESTIMATION (71) Applicant: INTEL CORPORATION, Santa Clara, CA (US)

(72) Inventors: Tzachi Hershkovich, Kefar Rut (IL); Yevgeny Priziment, Netanya (IL); Itay Benou, Holon (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/583,806

(22) Filed: Sep. 26, 2019

(65) Prior Publication Data

US 2020/0027216 A1 Jan. 23, 2020

Related U.S. Application Data

(60) Provisional application No. 62/881,073, filed on Jul. 31, 2019.

(51) Int. Cl.
*G06T 7/194* (2017.01)
*G06T 7/50* (2017.01)

(52) U.S. Cl.
CPC ............ *G06T 7/194* (2017.01); *G06T 7/50* (2017.01); *G06T 2207/10016* (2013.01); *G06T 2207/20072* (2013.01); *G06T 2207/20076* (2013.01)

(58) Field of Classification Search
CPC . G06T 2207/10016; G06T 2207/20072; G06T 2207/20076; G06T 7/11; G06T 7/143; G06T 7/194; G06T 7/50
See application file for complete search history.

(56) References Cited

U.S. PATENT DOCUMENTS

| | | | | |
|---|---|---|---|---|
| 10,096,122 | B1* | 10/2018 | Agrawal | G06T 7/11 |
| 10,217,195 | B1* | 2/2019 | Agrawal | G06T 7/11 |
| 2007/0206865 | A1* | 9/2007 | Boregowda | G06K 9/38 382/225 |
| 2010/0245535 | A1* | 9/2010 | Mauchly | G06T 7/593 348/14.08 |
| 2013/0286162 | A1* | 10/2013 | Lee | G06T 7/11 348/46 |
| 2018/0330184 | A1* | 11/2018 | Mehr | G06T 17/00 |
| 2019/0197696 | A1* | 6/2019 | Van Droogenbroeck | G06K 9/726 |
| 2019/0236788 | A1* | 8/2019 | Wang | G06T 7/11 |

OTHER PUBLICATIONS

Pukach et al. "3D Moving Object Point Cloud Refinement Using Temporal Inconsistencies", U.S. Appl. No. 16/583,787, filed Sep. 26, 2019, 30 pages.

* cited by examiner

*Primary Examiner* — Bobbak Safaipour
(74) *Attorney, Agent, or Firm* — Hanley, Flight & Zimmerman, LLC (57) ABSTRACT

A method for unsupervised image segmentation based on a background likelihood estimation is described herein. The method includes calculating a distance for each pixel in an input image and transforming each distance into a probability of the distance of belonging to a background of an input image or a foreground of the input image. The method also includes transforming each probability into a log likelihood value to form a unary term and minimizing an energy function including the unary term to obtain a set of foreground labels and a set of background labels.

25 Claims, 8 Drawing Sheets

UNSUPERVISED IMAGE SEGMENTATION BASED ON A BACKGROUND LIKELIHOOD ESTIMATION

CROSS REFERENCE TO RELATED APPLICATIONS

The present application claims the benefit of the filing date of U.S. Provisional Patent Application No. 62/881,073, filed Jul. 31, 2019, which is incorporated herein by reference.

BACKGROUND

Multiple cameras are used to capture activity in a scene. The multiple cameras may be used to enable volumetric capture in which a scene is captured from a plurality of viewpoints. Segmentation may be used to locate objects and boundaries (lines, curves, etc.) in data obtained from multiple cameras for volumetric capture purposes.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Generally, image segmentation partitions an image into one or more areas, regions, or segments. Segmentation may be achieved via thresholding, clustering, motion-based segmentation, compression-based segmentation, histogram-based segmentation, edge detection, region growing segmentation, partial differential equation-based segmentation, graph partitioning based segmentation, variational segmentation, and the like. Image segmentation may include determining a foreground region and a background of an image or image frame. In examples, the foreground region may include moving, dynamic objects, while the background region contains static, stationary objects. In some scenarios the background region may also include non-static objects, such as dynamic moving objects. For example, when viewing a sporting event, the crowd that surrounds the field of play may be considered a non-static object that is classified as being in the background region. Separating an image foreground from an image background is a required step in many computer vision tasks. Often, accurate segmentation in a dynamic scene with temporally and spatially varying illumination, shadows, reflections and non-static background, like a crowd in a sport event, is difficult.

Conventional segmentation techniques can largely be categorized into three groups: conventional techniques based on deep neural networks, conventional techniques based on clean background modeling, and conventional techniques based on statistical models. Conventional techniques based on deep neural networks represent a supervised learning approach including a deep neural network, which requires labeled training data. Conventional techniques based on clean background modeling can often use video frames to test against a clean background image. Using clean background modeling, areas with a significant difference relative to the clean background image are identified as potentially belonging to the foreground and are further processed and analyzed. Finally, conventional techniques that utilize a set of two Gaussian Mixture Models or some other statistical models to represent the distributions of foreground pixels and background pixels calculate a likelihood. In particular, given an input image and the statistical models, the likelihood of each pixel as belonging to the background region or the foreground region is calculated.

Conventional techniques are limited. For example, deep learning networks require manual labeling of vast amount of training data samples. Moreover, applying the conventional deep learning network to a different scene for segmentation will often require additional training with new examples from that scene. The acquisition of labeled samples is a time consuming and an expensive process. Additionally, conventional techniques using the clean background model requires knowledge of how to measure the difference between an input image and the clean background. In particular, conventional techniques using the clean background method must determine the difference that is considered significant enough to classify a pixel as foreground versus some other pixel classification. Moreover, conventional techniques that use a clean background segmentation often face difficulty in obtaining spatially smooth and accurate segmentation without holes in the foreground region and without background pixels protruding from the foreground segmented blob.

Statistical modeling of the background and foreground using a Gaussian Mixture Model or any other model requires sample data in order to estimate the models' parameters. Generation of this data often requires manual classification of pixels in a sample frame. Moreover, one of the weaknesses of the use of such models during segmentation is the difficulty in correctly classifying background pixels that have similar colors to those of a foreground. For example, white markings/lines on a football field might be incorrectly associated with white helmets worn by the players. Another weakness of this method is the need to adjust the model whenever significant changes, like different lightning conditions, occur in the scene.

The present techniques enable unsupervised image segmentation based on a background likelihood estimation. In particular, the present techniques perform foreground segmentation in a video sequence using a clean background image of the scene according to a similarity or distance metric used by a background update module and a tool to determine an optimal classification of each pixel. In embodiments, the tool may be a graph-cut optimization engine, graph-cut optimization technique, Markov Random Fields, Bayesian Networks, or any combinations thereof. For example, for all image pixels the distance of the pixel to a corresponding clean background image pixel is calculated. Next, this distance is used to obtain a probability of whether the pixel belongs to background or foreground. Finally, these probabilities are fed into graph-cut optimization technique along with other terms. The present techniques enable a combination of the background subtraction module and the graph-cut optimization engine, and also introduce a graph-cut term that is based on the distance between input frame and the clean background image.

A graph-cut optimization technique is implemented according to the present techniques. Graph-cut optimization is a type of combinatorial optimization. In particular, graph-cut optimization enables a determination of a location of an optimal object from a finite set of objects. Graph-cut optimization may be applied to families of functions of the discrete variables. In graph-cut optimization, determining a minimum cut over a graph that represents a flow network may be equivalent to computing a maximum flow over the network. The minimum cut of a graph is a cut for a partition of vertices of the graph into two disjointed subsets that is minimal in some sense. The maximum flow is a feasible flow through a flow network that is maximal in some sense.

In a graph-cut optimization, given a function $f$, a flow network can be constructed with positive weights such that each cut C of the network can be mapped to an assignment of variables y to the function $f$ and vice versa. Additionally, the within the flow network, the flow through each cut C equals $f(y)$, up to an additive constant. Based on the constructed flow network, it is possible to find a global optimum of $f$ in polynomial time by computing a minimum cut of the graph. The mapping between cuts and variable assignments is done by representing each variable with one node in the graph and, given a cut C, each variable will have a value of zero if the corresponding node belongs to the component connected to the source, or a value of one if the variable belongs to the component connected to the sink. In this manner, graph-cut optimization enables image segmentation by computing a global optimum among all segmentations satisfying the constraints. Constraints for segmentation may be used to indicate particular pixels that are components of the background. In embodiments, the constraints may explicitly specify that a subset of pixels (or graph nodes) belongs to the background class, while for some other subset of pixels it is explicitly specified that it belongs to the foreground class. The remaining pixels may be assigned to one of the classes (background or foreground) according to their likelihoods and spatial relations. With respect to spatial relations, a smoothness term may also be used.

The present techniques enable binary segmentation, which assigns to each pixel one of two labels: foreground or background. In embodiments, the present techniques operate on a video sequence on a frame by frame basis, in real-time. Each frame is analyzed along with a clean background image, which represents the scene without any foreground objects. The clean background image is determined based on all frames in the video sequence, a subset of frames in a video sequence, or the frames available during real-time processing. For each pixel of the analyzed input frame, a distance is calculated relative to the corresponding pixel in the clean background image. This distance might consist of a number of components which quantify the dissimilarity of brightness and color components of the input image pixel and the corresponding clean background image pixel. Accordingly, the distance calculated as described herein may include a component that represents brightness and a component that represents color. In this manner, the distance can represent a color space including all of the colors in the spectrum, as well as colors outside of human perception.

Next, using a probability density function (PDF), the calculated distance is transformed into a probability of the input frame pixel to belong to either the background region or to the foreground region. The PDF is a function whose value at any given point in the sample space yields a relative likelihood that the value of the random variable would equal the value of that point in the sample space. These probabilities are further transformed into log likelihood values and form a unary term, where each pixel independently contributes to the unary term. The unary term is then fed into a graph-cut (min-cut-max-flow) optimization engine. The graph-cut engine performs a minimization of an energy function which consists of the unary term and possibly other terms that impose spatial smoothness constraints and introduce additional information regarding the background and foreground pixel classes. The result of this minimization is a set of foreground/background labels for each pixel of an image.

While conventional techniques include supervised deep neural networks (DNNs) which require data labels, the present techniques are fully unsupervised and require minimal configuration. Indeed, the entire model is unsupervised and needs no data labels. Specifically, conventional techniques operate only if all data is labeled. By contrast, the present techniques operate without the use of labeled data. In some cases, the present techniques include a clean background update module to obtain distances. The obtained distances of input frame pixels may carry more discriminating information as to whether the pixel is more likely to be part of background or foreground. Further, a large portion of calculations executed according to the present techniques are reused. Due to the large reuse of calculations by the clean background update module, the impact on the system's computational load is relatively low.

Moreover, the present techniques are advantageous as the calculations for each pixel are independent, allowing for high parallelization of the implementation. The resulting high accuracy segmentation according to the present techniques enables more accurate processing, which can be used in three-dimensional (3D) object reconstruction when the present techniques are executed on data from each camera in a multi-view setup. Furthermore, the present techniques are modular, where each component (such as the clean background modeling, distance probability density function, graph-cut terms) can be replaced by similar modules which might be more adjusted to the problem at hand.

In embodiments, the present techniques may enable a tool which provides a high accuracy segmentation without a need for any initial training or manual selection of foreground or background regions in the image. The present techniques may also enable a tool that correctly classifies background pixels which have similar colors to foreground pixels and are not adjacent to a foreground object. For example, the white stripes on an American football field may be classified as background pixels even in the presence of white football helmets. Accordingly, the present techniques enable image segmentation without any training and utilizes graph-cut optimization.

For ease of description the present techniques are described using a codebook background subtraction algorithm. However, the present techniques may be used with any set of input images and any non-codebook background subtraction algorithms. The codebook background subtraction algorithm as described herein quantizes sample background values for each pixel into codebooks, where each codebook represents a compressed form of background model for a sequence of images, such as those in a video sequence. In some embodiments, the codebook background subtraction may use clustering techniques at each pixel to cluster sample values into a set of codewords. In this manner, the background may be encoded on a pixel by pixel basis.

First, the scene's clean background image CBG(t) is continuously modeled for each time frame t, using the input video frames, $\{I(t-s)\}_{s=K}^{0}$, in order to make the required updates to the existing model, see Eq. (1). Variable s is an iterator that runs from K to 0. Input video frames $\{I(t-s)\}_{s=K}^{0}$ denote a set of K frames preceding the current frame, plus the current frame itself that can be used by the clean background modeling algorithm to build a clean background image. Theoretically, K might be as small as 0 and as large as the memory allows it.

Updates to the model are required in order to incorporate any changes that might have occurred in the scene, like the new lighting conditions, a moving large shadow cast by a background object (e.g., cloud or tree), frame regions that might have been occluded in previous frames and become uncovered etc. The result of this process is a clean background image that can be used in analysis of a set of next input images for foreground segmentation.

$$CBG(t)=f(CBG(t-K),I(t-K+1),I(t-K+2), \ldots ,I(t-1),I(t)) \quad (1)$$

Second, for a new input frame, the latest background model image is used to calculate the pixel-wise distance to the background. Given a an input image pixel $x=(r, g, b)$ and a corresponding clean background pixel $v=(\tilde{r}, \tilde{g}, \tilde{b})$, the distance is calculated as a two tuple vector consisting of a brightness distance, $d_b$, and color distance, $d_c$, components as given by equations (1) and (2) respectively and shown in FIG. 1.

Figure 1:
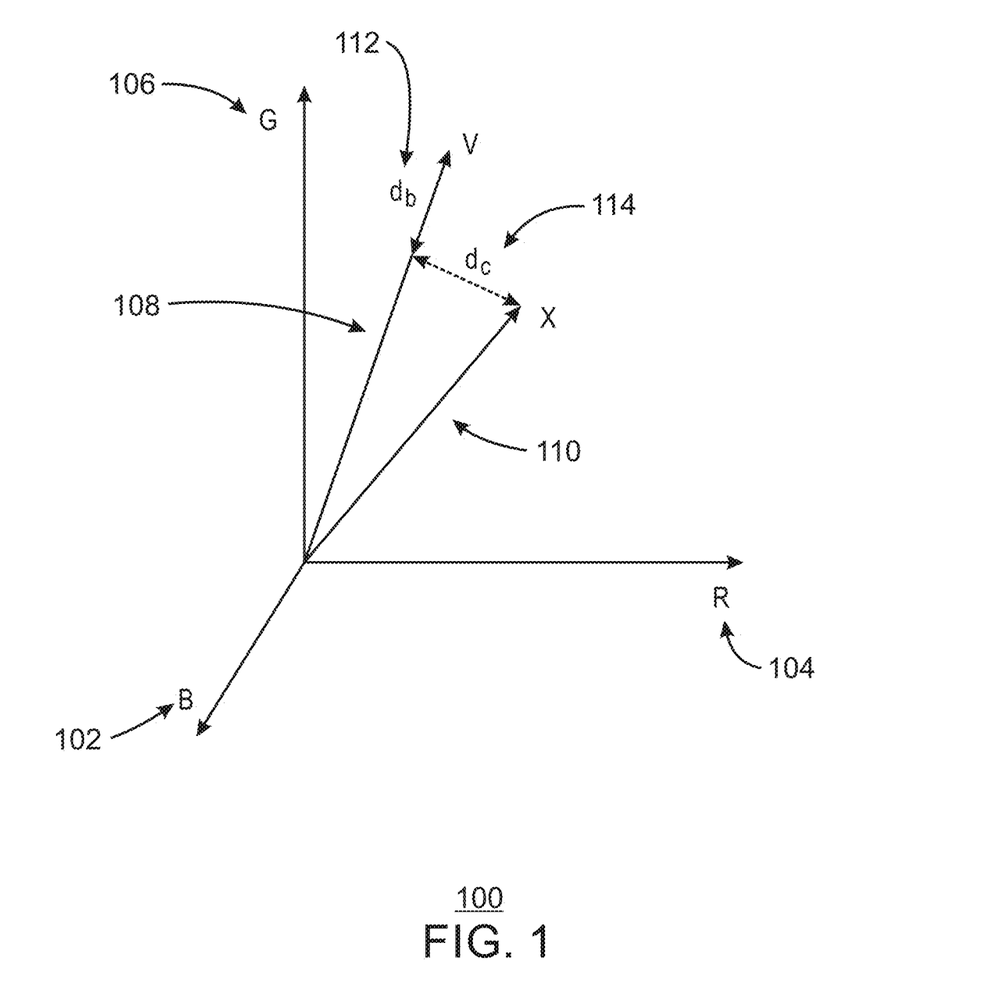
FIG. 1 is an illustration of distances between an input image pixel x and a clean background pixel v.

FIG. 1 is an illustration of a red, green, blue (RGB) color space 100. The RGB color space 100 is defined by the three chromaticities of the red, green, and blue colors, and can produce any chromaticity defined by those colors. The colors of the RGB color space may be referred to as color channels. As illustrated, the axis 102 represents the blue (B) color channel, the axis 104 represents the red (R) color channel, the axis 106 represents the green (G) color channel. An input pixel x 110 is located within the color space 100 and represented by a vector corresponding to the r, g, b values of the input pixel x 110. Additionally, corresponding clean background pixel v 112 is located within the color space 100 and represented by a vector corresponding to the $\tilde{r}, \tilde{g}, \tilde{b}$ values of the clean background pixel v 108. The clean background pixel v 108 may be derived using any number of background subtraction techniques. In the example of a codebook algorithm, for each pixel a codebook is derived consisting of one or more codewords. Samples at each pixel are clustered into the set of codewords based on a color distortion metric together with brightness bounds. In the codebook algorithm, if a pixel is within particular color and brightness differences, it is classified as a background pixel. In particular, if the color distortion of the pixel to some codeword is less than a detection threshold, and the brightness of the pixel is within the brightness range of that codeword it is classified as a background pixel of the clean background image. Otherwise, the pixel is classified as a foreground pixel of the clean background image.

As illustrated, within the color space 100 distances between the input pixel x 110 and the clean background pixel v 108 may be determined. In FIG. 1, a distance $d_b$ 112 is the difference in brightness or luminance between the input pixel x 110 and the clean background pixel v 108 and is represented by a vector in the color space 100. A distance $d_c$ 114 represents the difference in color or chromaticity between the input pixel x 110 and the clean background pixel v 108. The distances may be calculated as a two tuple vector consisting of a brightness, $d_b$, and color, $d_c$, components as given by equations (1) and (2) respectively and shown in FIG. 1.

$$d_b = \left| \|v\| - \frac{\langle x, v \rangle}{\|v\|} \right| \quad (1)$$

$$d_c = \sqrt{\|x\|^2 - \frac{\langle x, v \rangle^2}{\|v\|^2}} \quad (2)$$

In particular, the distance $d_b$ is calculated as the absolute value of the Euclidean norm of the vector that represents the clean background pixel v, minus an inner product of the input pixel x and the clean background pixel v divided by the Euclidean norm of the vector that represents the clean background pixel v. The distance $d_c$ is calculated as the square root of Euclidean norm of the vector that represents the input pixel x, minus a squared inner product of the input pixel x and the clean background pixel v divided by a squared Euclidean norm of the vector that represents the clean background pixel v.

Figure 2:
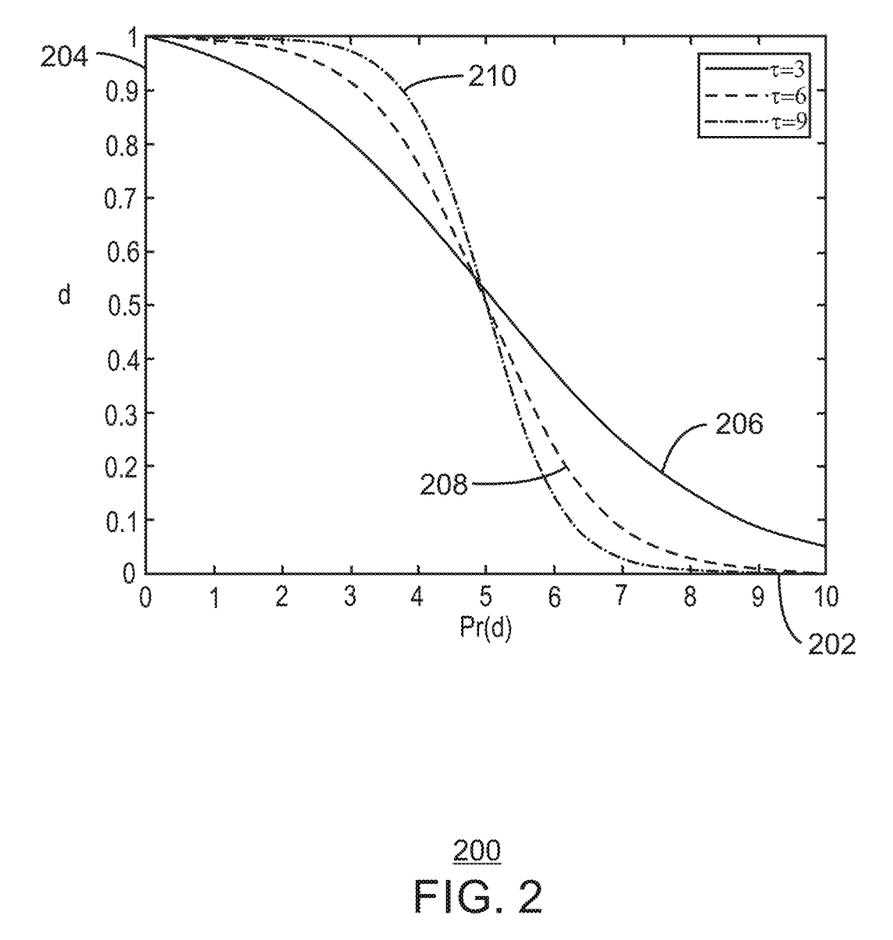
FIG. 2 is an illustration of a general distance PDF function.

The calculated distances of brightness distance $d_b$ and color distance $d_c$ are transformed into probabilities using a probability density function. This density function is incorporated into a min-cut-max-flow formulation. For example, a sigmoid based function, as given in Eq. (3), can be used to map small distance values to high probabilities that belong to the background of an image. Similarly, large distance values are mapped low probabilities of belonging to the background. The PDF may be used to map the distance into a probability of belonging to the background of the input image or the foreground of the input image. The PDF is given by:

$$Pr(d) = \frac{1}{C} \frac{1 + e^{-\tau}}{1 + e^{(d-r)\tau/r}} \quad (3)$$

where the variable r is the function's Pr(d) transition point, r is an exponential decay parameter, and C is a normalization factor. The transition point may be the point that marks a transition from background values to foreground values, and vice versa. The normalization factor in the exemplary probability density function of Eq. (4) guarantees that the integral over the PDF equals to 1. The function Pr(d) is a monotonically decreasing function with a global maximum at d=0, such that Pr(0)=1 and Pr(∞)=0. In embodiments, the transition point r of function Pr(d) is a location along the d axis where the function makes a sudden transition. In embodiments, r controls the location of the transition point between distance values that will be associated with background and those associated with foreground, while τ controls the width of this transition band as depicted in FIG. 2. The set of parameters $r_b$ and $\tau_b$ that are applied in the brightness distance PDF may be different from the set of parameters $r_c$ and $\tau_c$ that are applied in the color distance PDF. These PDF functions are denoted by $Pr_b(\bullet)$ and $Pr_c(\bullet)$, respectively.

FIG. 2 is an illustration of a general distance PDF function with a transition point of r=5 and multiple values of τ. The x-axis 202 represents the general distance function Pr(d). The y-axis 204 represents a general distance d. In embodiments, the general distance function Pr(d) may be a brightness distance function $Pr(d_b)$. Additionally, in embodiments, the general distance function Pr(d) may be a color distance function $Pr(d_c)$. In FIG. 2, a value of τ=3 is illustrated and represented by solid line 206. A value of τ=6 is illustrated and represented by dashed line 208. Moreover, a value of τ=9 is illustrated and represented by dashed with a dotted line 210.

Assuming statistical independence between the color and brightness distances, the overall probability of a pixel as belonging to the background is calculated by the product of the two marginal probabilities, as given in Eq. (4).

$$Pr(x \in \text{Background}|v) = Pr_b(d_b) \cdot Pr_c(d_c) \quad (4)$$

Thus, the probability of a pixel as belonging to the background may be found by calculating the product of a color distance probability density function and a brightness distance probability density function. Once the probability of pixel x as belonging to background, $Pr(x \in \text{Background}|v)$, is known, the complementary probability that pixel x belongs to the foreground is calculated as given by Eq. (6).

$$Pr(x \in \text{Foreground}|v) = 1 - Pr(x \in \text{Background}|v) \quad (5)$$

In order to feed these probabilities into a graph-cut optimization engine, they are transformed into log likelihood values as in Eq. (6)

$$LL_{Bg} = \ln(Pr(x \in \text{Background}|v))$$

$$LL_{Fg} = \ln(Pr(x \in \text{Foreground}|v)) \quad (6)$$

In embodiments, the log likelihood values are used as edge weights in a flow-graph that will be processed by the graph-cut algorithm. The graph-cut optimization technique is applied to an energy function E which consists of a weighted sum of the data/unary terms $U_n$, and smoothness/binary terms $V_m$ for the edge energies.

$$E = \sum_{n=1}^{N} \alpha_n U_n + \sum_{m=1}^{M} \beta_m V_m \quad (7)$$

The unary term $U_n$ is a sum of log likelihood values over all image pixels. If the pixel is labeled as the background, then the $LL_{Bg}$ term contributes to the unary term $U_n$ sum for that pixel. Similarly, if the pixel is labeled as the foreground the $LL_{Fg}$ contributes to the unary term $U_n$ sum for that pixel. The goal of the graph-cut algorithm is to find a label for each pixel so that the overall sum over all terms results in a minimal energy.

Figure 3:
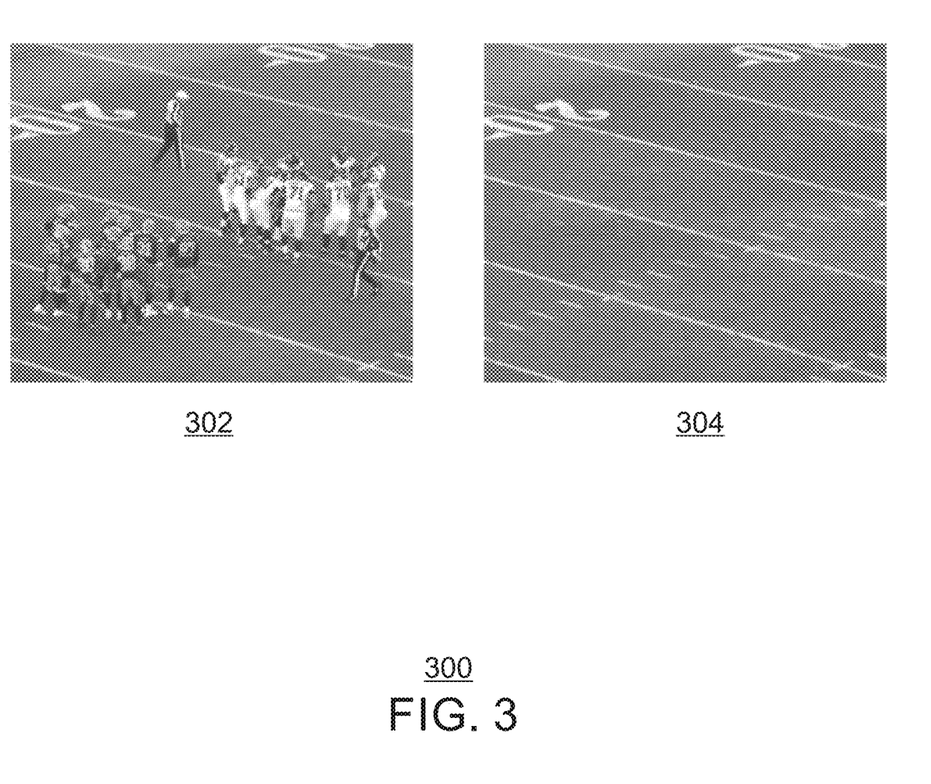
FIG. 3 is an illustration of an input frame and a clean background.
Figure 4:
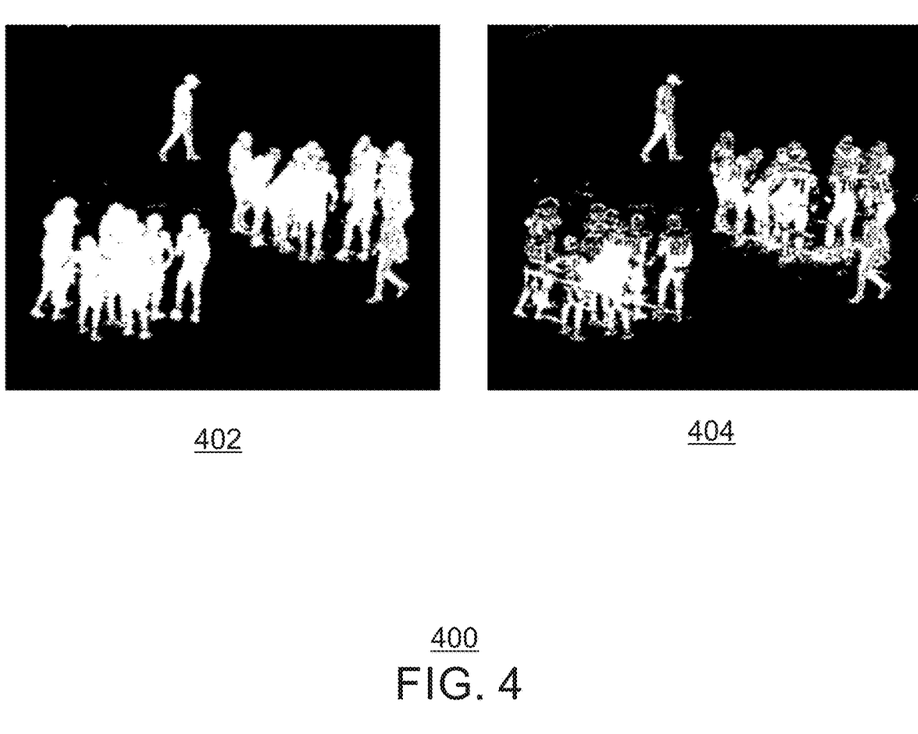
FIG. 4 is an illustration of graph-cut segmentation using only using a background distance term.
Figure 5:
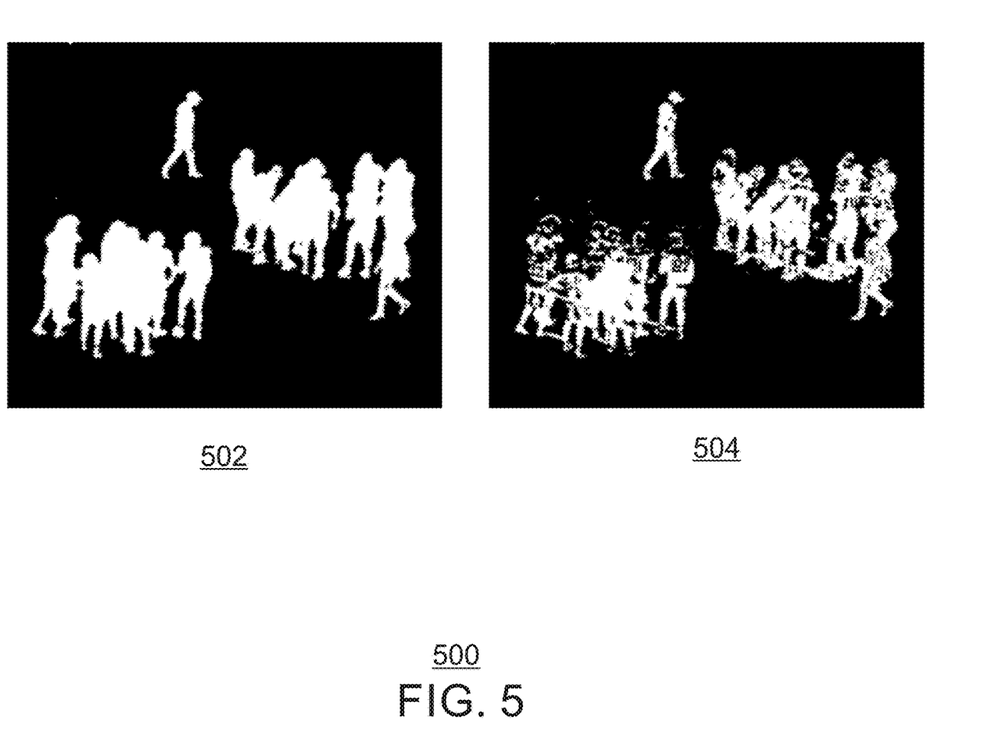
FIG. 5 is an illustration of graph-cut segmentation using for a background distance term and a smoothness term.

An example of the results obtained for an input and clean background images from FIG. 3 according to the present techniques can be seen in FIG. 4 using the background distance term only and in FIG. 5 for background distance term with smoothness term. The image 402 in FIG. 4 illustrates graph-cut segmentation results using the clean background-based distance according to the present techniques. The image 404 illustrates the graph-cut segmentation results using a Gaussian distribution and Euclidian distance. The image 502 of FIG. 5 illustrates graph-cut segmentation results using the clean background-based distance and a smoothness term according to the present techniques. The image 504 of FIG. 5 illustrates the graph-cut segmentation results with a smoothness term using a Gaussian distribution and Euclidian distance.

The present techniques may be implemented in conjunction with volumetric capture techniques. In a multiple-view (multi-view) set-up, multiple cameras are used to capture activity in a scene. The multiple cameras may be used to enable volumetric capture, where a scene is recorded from a plurality of viewpoints. The captured images may be processed to create high quality three-dimensional models for volumetric content. In particular, a three-dimensional point cloud may be estimated during three-dimensional scene capture.

A sporting event may be captured via a volumetric capture method, with footage captured by a plurality of cameras. The cameras may be 5K ultra-high-definition cameras that capture height, width and depth data to produce voxels (pixels with volume). Thus, a camera system according to the present techniques may include multiple super-high-resolution cameras to capture the entire playing field. After the game content is captured, a substantial amount of data is processed, where all the viewpoints of a fully volumetric three-dimensional person or object are recreated. This information may be used to render a virtual environment in a multi-perspective three-dimensional format that enables users to experience a captured scene from any angle and perspective and can provide true six degrees of freedom.

Image segmentation is crucial to the real-time broadcasting of volumetric content. Typically, the result of image segmentation is a "mask"—an image of the same dimensions as the input image in which the foreground content is preserved and the background content has been set to black. When image segmentation is executed in resource constrained environments or when encountering unanticipated images, even the best segmentation algorithms can produce inaccurate results. Moreover, in a streaming volumetric broadcast, where the foreground of an image are the humans portrayed in the image, poor quality segmentation results in the volumetric broadcast of humans with missing limbs, or extra blobs protruding from their bodies. This is a poor end-user experience. As a result, an accurate segmentation is a crucial prerequisite for viability of broadcast quality volumetric video streaming.

Figure 6:
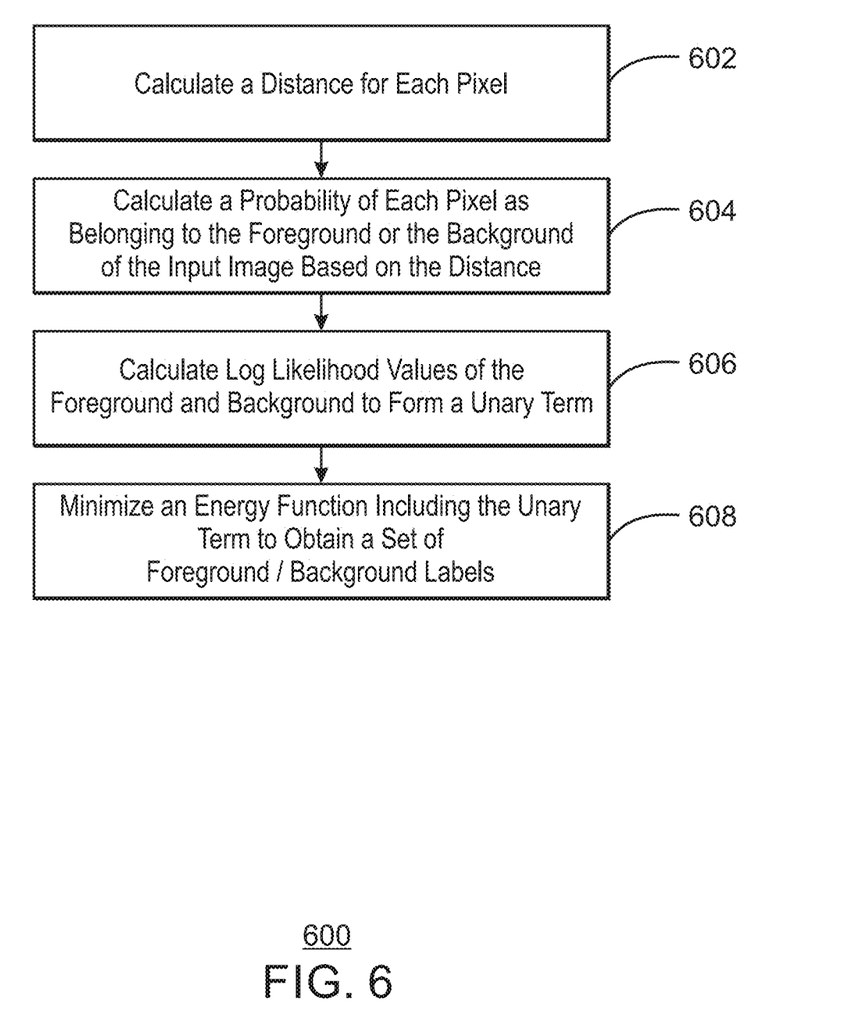
FIG. 6 is a block diagram of a method that enables unsupervised image segmentation based on a background likelihood estimation.

FIG. 6 is a block diagram of a method 600 that enables unsupervised image segmentation based on a background likelihood estimation. At block 602, a distance is calculated for each pixel in an input image. The distance may be a difference between components of an input pixel x and the same components of the corresponding clean background pixel v. In embodiments, the input image may be obtained from a multiple view camera system. The clean background image may be obtained using a clean background subtraction algorithm such as a codebook model background subtraction. In embodiments, sample background values at each pixel are quantized into codebooks. The codebooks represent a compressed form of background model for a video sequence.

At block 604, for each pixel in the input image, a probability of each pixel as belonging to a background of an input image or a foreground of the input image is determined. In embodiments, the probability is determined according to a probability density function. The probability density function may be derived using the distances determined for each pixel of the input image. At block 606, the probabilities are used to calculate a set of log likelihood values that form a unary term. In embodiments, the unary term includes input from each pixel in the input image. At block 608, an energy function is minimized. The energy function includes the unary term, and is minimized to obtain a set of foreground labels and a set of background labels for pixels of the input image.

Figure 7:
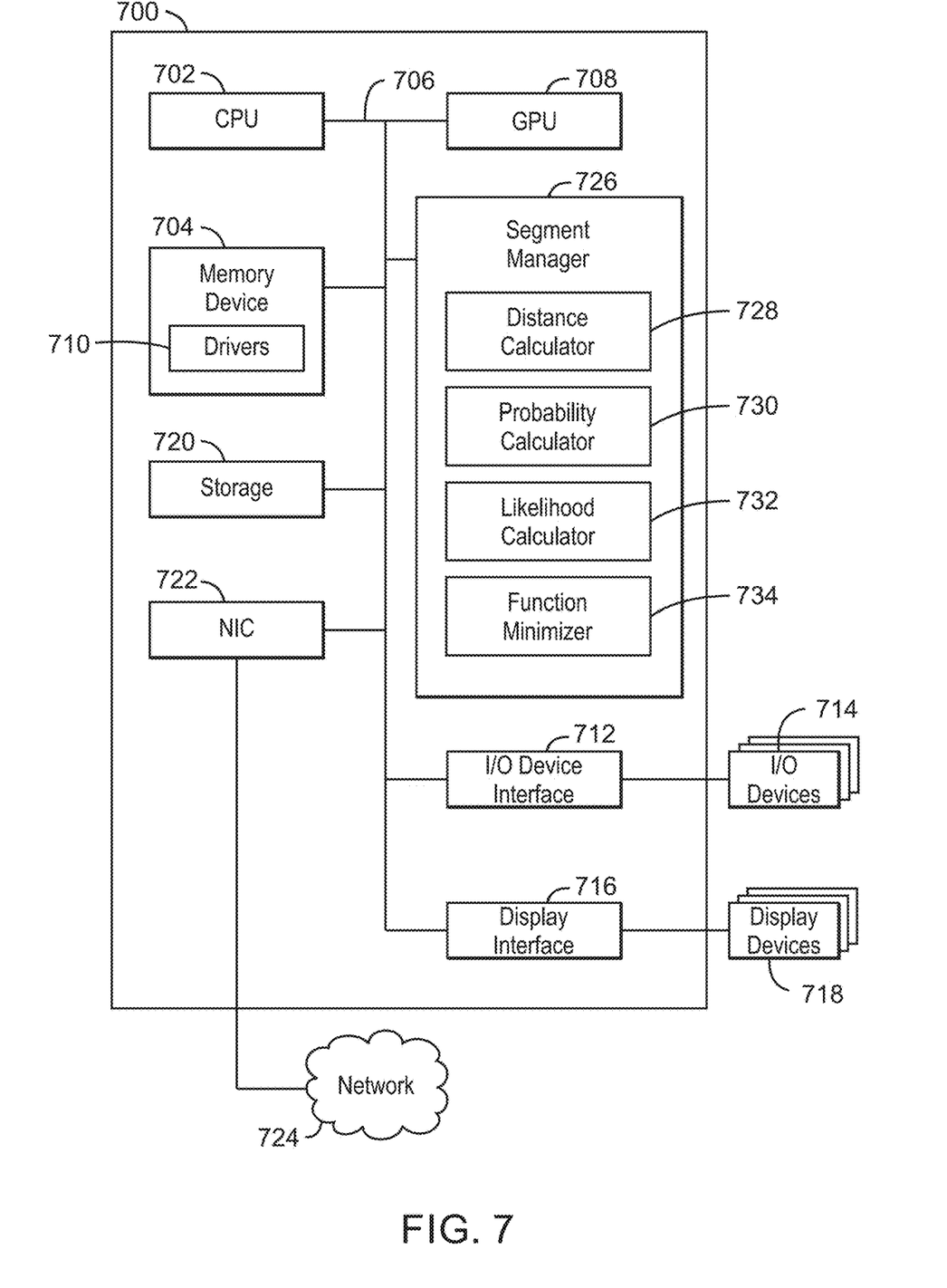
FIG. 7 is a block diagram of a system that enables unsupervised image segmentation based on a background likelihood estimation.

Referring now to FIG. 7, a block diagram is shown of a system that enables unsupervised image segmentation based on a background likelihood estimation. The computing device 700 may be, for example, a laptop computer, desktop computer, tablet computer, mobile device, or wearable device, among others. The computing device 700 may include a central processing unit (CPU) 702 that is configured to execute stored instructions, as well as a memory device 704 that stores instructions that are executable by the CPU 702. The CPU 702 may be coupled to the memory device 704 by a bus 706. Additionally, the CPU 702 can be a single core processor, a multi-core processor, a computing cluster, or any number of other configurations. Furthermore, the computing device 700 may include more than one CPU 702. In some examples, the CPU 702 may be a system-on-chip (SoC) with a multi-core processor architecture. In some examples, the CPU 702 can be a specialized digital signal processor (DSP) used for image processing. The memory device 704 can include random access memory (RAM), read only memory (ROM), flash memory, or any other suitable memory systems. For example, the memory device 704 may include dynamic random-access memory (DRAM). The memory may include drivers 710.

The computing device 700 may also include a graphics processing unit (GPU) 708. As shown, the CPU 702 may be coupled through the bus 706 to the GPU 708. The GPU 708 may be configured to perform any number of graphics operations within the computing device 700. For example, the GPU 708 may be configured to render or manipulate graphics images, graphics frames, videos, or the like, to be displayed to a viewer of the computing device 700.

The CPU 702 may also be connected through the bus 706 to an input/output (I/O) device interface 712 configured to connect the computing device 700 to one or more I/O devices 714. The I/O devices 714 may include, for example, a keyboard and a pointing device, wherein the pointing device may include a touchpad or a touchscreen, among others. The I/O devices 714 may be built-in components of the computing device 700, or may be devices that are externally connected to the computing device 700. In some examples, the memory 704 may be communicatively coupled to I/O devices 714 through direct memory access (DMA).

The CPU 702 may also be linked through the bus 706 to a display interface 716 configured to connect the computing device 700 to a display device 716. The display devices 718 may include a display screen that is a built-in component of the computing device 700. The display devices 718 may also include a computer monitor, television, or projector, among others, that is internal to or externally connected to the computing device 700. The display device 716 may also include a head mounted display.

The computing device 700 also includes a storage device 720. The storage device 720 is a physical memory such as a hard drive, an optical drive, a thumbdrive, an array of drives, a solid-state drive, or any combinations thereof. The storage device 720 may also include remote storage drives.

The computing device 700 may also include a network interface controller (NIC) 722. The NIC 722 may be configured to connect the computing device 700 through the bus 706 to a network 724. The network 724 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 700 further includes a segment manager 726. The segment manager 726 may be configured to partition an image or a series of images into a number of segments. In particular, the segment manager 726 may enable binary segmentation in order to partition an input image into a foreground region and a background region. The segment manager 726 includes a distance calculator 728. The distance calculator may calculate a distance for each pixel in an input image. In embodiments, the input image may be obtained from a multi-view camera system. The probability calculator 730 may calculate a probability of each pixel as belonging to a background of the input image or a foreground of the input image based on the distance. A likelihood calculator 732 may transform each probability into a log likelihood value and form a unary term. A function minimizer 734 may minimize an enable an energy function that includes the unary term. The energy function is minimized to obtain a set of foreground labels and a set of background labels.

The block diagram of FIG. 7 is not intended to indicate that the computing device 700 is to include all of the components shown in FIG. 7. Rather, the computing device 700 can include fewer or additional components not illustrated in FIG. 7, such as additional buffers, additional processors, and the like. The computing device 700 may include any number of additional components not shown in FIG. 7, depending on the details of the specific implementation. Furthermore, any of the functionalities of the segment manager 726, distance calculator 728, probability calculator 730, likelihood calculator 732, and function minimizer 734 may be partially, or entirely, implemented in hardware and/or in the processor 702. For example, the functionality may be implemented with an application specific integrated circuit, in logic implemented in the processor 702, or in any other device. For example, the functionality of the segment manager 726 may be implemented with an application specific integrated circuit, in logic implemented in a processor, in logic implemented in a specialized graphics processing unit such as the GPU 708, or in any other device.

Figure 8:
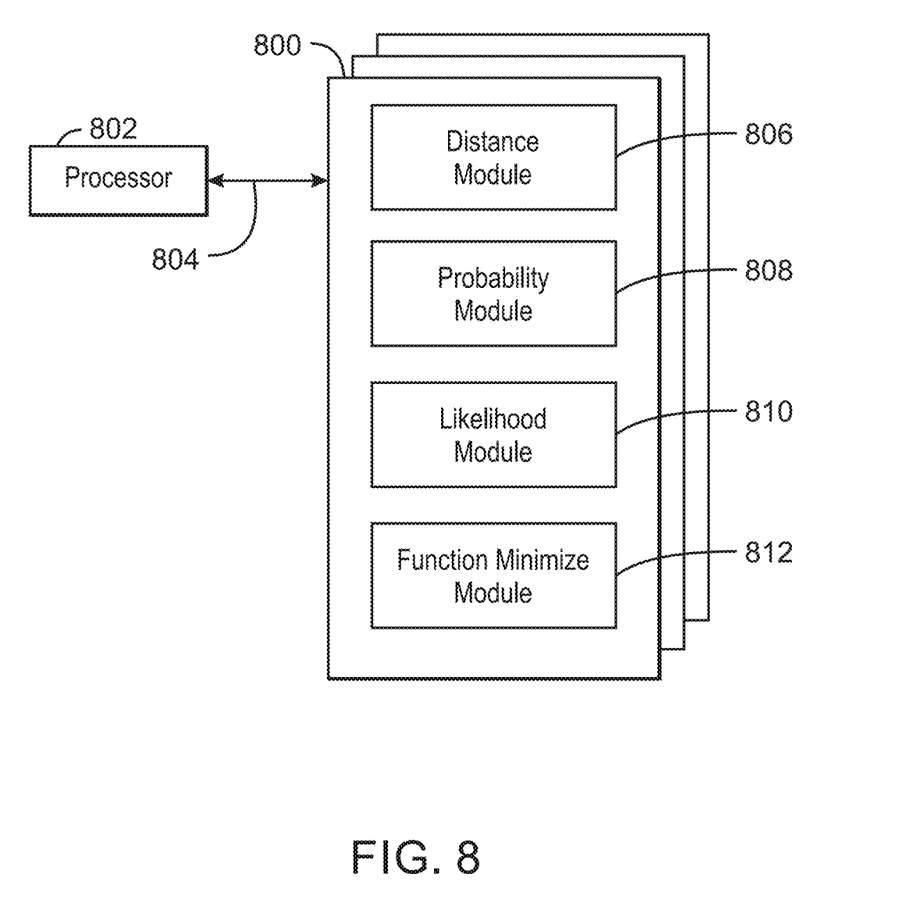
FIG. 8 is a block diagram showing computer readable media that stores code for that enables unsupervised image segmentation based on a background likelihood estimation.

FIG. 8 is a block diagram showing computer readable media 800 that stores code for unsupervised image segmentation based on a background likelihood estimation. The computer readable media 800 may be accessed by a processor 802 over a computer bus 804. Furthermore, the computer readable medium 800 may include code configured to direct the processor 802 to perform the methods described herein. In some embodiments, the computer readable media 800 may be non-transitory computer readable media. In some examples, the computer readable media 800 may be storage media.

The various software components discussed herein may be stored on one or more computer readable media 800, as indicated in FIG. 8. For example, a distance module 806 may be configured to calculate a distance for each pixel in an input image. A probability module 808, may be configured to calculate a probability of each pixel as belonging to a background of the input image or a foreground of the input image based on the distance. A likelihood module 810 may be configured to transform each probability into a log likelihood value and form a unary term. A function minimize module 812 may be configured to minimize an energy function that includes the unary term. The energy function is minimized to obtain a set of foreground labels and a set of background labels.

The block diagram of FIG. 8 is not intended to indicate that the computer readable media 800 is to include all of the components shown in FIG. 8. Further, the computer readable media 800 may include any number of additional components not shown in FIG. 8, depending on the details of the specific implementation.

EXAMPLES

Example 1 is a method for unsupervised image segmentation based on a background likelihood estimation. The method includes calculating a distance for each pixel in an input image; calculating a probability of each pixel in the input image as belonging to a background of the input image or a foreground of the input image based on the distance; transforming each probability into a log likelihood value to form a unary term; and minimizing an energy function including the unary term to obtain a set of foreground labels and a set of background labels.

Example 2 includes the method of example 1, including or excluding optional features. In this example, the distance is derived from a vector representation in a color space of a pixel of the input image and a corresponding pixel from a clean background image.

Example 3 includes the method of any one of examples 1 to 2, including or excluding optional features. In this example, the distance is derived from a vector representation in a color space of a pixel of the input image and a corresponding pixel from a clean background image, and wherein the distance comprises a brightness component and a color component.

Example 4 includes the method of any one of examples 1 to 3, including or excluding optional features. In this example, the probability of each pixel is determined via a probability density function applied to a brightness component and a color component of the distance.

Example 5 includes the method of any one of examples 1 to 4, including or excluding optional features. In this example, the probability of each pixel is calculated as a product of a brightness probability density function and a color probability density function.

Example 6 includes the method of any one of examples 1 to 5, including or excluding optional features. In this example, graph-cut optimization is applied to minimize the energy function including the unary term.

Example 7 includes the method of any one of examples 1 to 6, including or excluding optional features. In this example, calculating the distance for each pixel in the input image comprises determining a clean background model for a sequence of images comprising the input image.

Example 8 includes the method of any one of examples 1 to 7, including or excluding optional features. In this example, calculating the distance for each pixel in the input image comprises updating a clean background model for a sequence of images comprising the input image.

Example 9 includes the method of any one of examples 1 to 8, including or excluding optional features. In this example, the energy function comprises the unary term and additional terms to impose spatial smoothness constraints and additional information regarding the background and foreground pixel classes.

Example 10 includes the method of any one of examples 1 to 9, including or excluding optional features. In this example, a set of parameters is applied to a probability density function to map the distance into a probability of belonging to the background of the input image or the foreground of the input image.

Example 11 is a system for unsupervised image segmentation based on a background likelihood estimation. The system includes a distance calculator to calculate a distance for each pixel in an input image; a probability calculator to calculate a probability of each pixel in the input image as belonging to a background of the input image or a foreground of the input image based on the distance; a likelihood calculator to transform each probability into a log likelihood value and form a unary term; and a function minimizer to minimize an energy function including the unary term to obtain a set of foreground labels and a set of background labels.

Example 12 includes the system of example 11, including or excluding optional features. In this example, the distance is derived from a vector representation in a color space of a pixel of the input image and a corresponding pixel from a clean background image.

Example 13 includes the system of any one of examples 11 to 12, including or excluding optional features. In this example, the distance is derived from a vector representation in a color space of a pixel of the input image and a corresponding pixel from a clean background image, and wherein the distance comprises a brightness component and a color component.

Example 14 includes the system of any one of examples 11 to 13, including or excluding optional features. In this example, the probability of each pixel is determined via a probability density function applied to a brightness component and a color component of the distance.

Example 15 includes the system of any one of examples 11 to 14, including or excluding optional features. In this example, the probability of each pixel is calculated as a product of a brightness probability density function and a color probability density function.

Example 16 includes the system of any one of examples 11 to 15, including or excluding optional features. In this example, graph-cut optimization is applied to minimize the energy function including the unary term.

Example 17 includes the system of any one of examples 11 to 16, including or excluding optional features. In this example, calculating the distance for each pixel in the input image comprises determining a clean background model for a sequence of images comprising the input image.

Example 18 includes the system of any one of examples 11 to 17, including or excluding optional features. In this example, calculating the distance for each pixel in the input image comprises updating a clean background model for a sequence of images comprising the input image.

Example 19 includes the system of any one of examples 11 to 18, including or excluding optional features. In this example, the energy function comprises the unary term and additional terms to impose spatial smoothness constraints and additional information regarding the background and foreground pixel classes.

Example 20 includes the system of any one of examples 11 to 19, including or excluding optional features. In this example, a set of parameters is applied to a probability density function to map the distance into a probability of belonging to the background of the input image or the foreground of the input image.

Example 21 is at least one non-transitory computer-readable medium. The computer-readable medium includes instructions that direct the processor to calculate a distance for each pixel in an input image; calculate a probability of each pixel in the input image as belonging to a background of the input image or a foreground of the input image based on the distance; transform each probability into a log likelihood value to form a unary term; and minimize an energy function including the unary term to obtain a set of foreground labels and a set of background labels.

Example 22 includes the computer-readable medium of example 21, including or excluding optional features. In this example, the distance is derived from a vector representation in a color space of a pixel of the input image and a corresponding pixel from a clean background image.

Example 23 includes the computer-readable medium of any one of examples 21 to 22, including or excluding optional features. In this example, the distance is derived from a vector representation in a color space of a pixel of the input image and a corresponding pixel from a clean background image, and wherein the distance comprises a brightness component and a color component.

Example 24 includes the computer-readable medium of any one of examples 21 to 23, including or excluding optional features. In this example, the probability of each pixel is determined via a probability density function applied to a brightness component and a color component of the distance.

Example 25 includes the computer-readable medium of any one of examples 21 to 24, including or excluding optional features. In this example, the probability of each pixel is calculated as a product of a brightness probability density function and a color probability density function.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A method for unsupervised image segmentation based on a background likelihood estimation, comprising:
    calculating a distance for each pixel in an input image;
    calculating a probability of each pixel in the input image as belonging to a background of the input image or a foreground of the input image based on the distance;
    transforming each probability into a log likelihood value to form a unary term; and
    minimizing an energy function including the unary term to obtain a set of foreground labels and a set of background labels.

2. The method of claim 1, wherein the distance is derived from a vector representation in a color space of a pixel of the input image and a corresponding pixel from a clean background image.

3. The method of claim 1, wherein the distance is derived from a vector representation in a color space of a pixel of the input image and a corresponding pixel from a clean background image, and wherein the distance comprises a brightness component and a color component.

4. The method of claim 1, wherein the probability of each pixel is determined via a probability density function applied to a brightness component and a color component of the distance.

5. The method of claim 1, wherein the probability of each pixel is calculated as a product of a brightness probability density function and a color probability density function.

6. The method of claim 1, wherein graph-cut optimization is applied to minimize the energy function including the unary term.

7. The method of claim 1, wherein calculating the distance for each pixel in the input image comprises determining a clean background model for a sequence of images comprising the input image.

8. The method of claim 1, wherein calculating the distance for each pixel in the input image comprises updating a clean background model for a sequence of images comprising the input image.

9. The method of claim 1, wherein the energy function comprises the unary term and additional terms to impose spatial smoothness constraints and additional information regarding the background and foreground pixel classes.

10. The method of claim 1, wherein a set of parameters is applied to a probability density function to map the distance into a probability of belonging to the background of the input image or the foreground of the input image.

11. A system for unsupervised image segmentation based on a background likelihood estimation, comprising:
    a distance calculator to calculate a distance for each pixel in an input image;
    a probability calculator to calculate a probability of each pixel in the input image as belonging to a background of the input image or a foreground of the input image based on the distance;
    a likelihood calculator to transform each probability into a log likelihood value and form a unary term; and a function minimizer to minimize an energy function including the unary term to obtain a set of foreground labels and a set of background labels.

12. The system of claim 11, wherein the distance is derived from a vector representation in a color space of a pixel of the input image and a corresponding pixel from a clean background image.

13. The system of claim 11, wherein the distance is derived from a vector representation in a color space of a pixel of the input image and a corresponding pixel from a clean background image, and wherein the distance comprises a brightness component and a color component.

14. The system of claim 11, wherein the probability of each pixel is determined via a probability density function applied to a brightness component and a color component of the distance.

15. The system of claim 11, wherein the probability of each pixel is calculated as a product of a brightness probability density function and a color probability density function.

16. The system of claim 11, wherein graph-cut optimization is applied to minimize the energy function including the unary term.

17. The system of claim 11, wherein calculating the distance for each pixel in the input image comprises determining a clean background model for a sequence of images comprising the input image.

18. The system of claim 11, wherein calculating the distance for each pixel in the input image comprises updating a clean background model for a sequence of images comprising the input image.

19. The system of claim 11, wherein the energy function comprises the unary term and additional terms to impose spatial smoothness constraints and additional information regarding the background and foreground pixel classes.

20. The system of claim 11, wherein a set of parameters is applied to a probability density function to map the distance into a probability of belonging to the background of the input image or the foreground of the input image.

21. At least one non-transitory computer-readable medium, comprising instructions to direct a processor to:
calculate a distance for each pixel in an input image;
calculate a probability of each pixel in the input image as belonging to a background of the input image or a foreground of the input image based on the distance;
transform each probability into a log likelihood value to form a unary term; and
minimize an energy function including the unary term to obtain a set of foreground labels and a set of background labels.

22. The computer-readable medium of claim 21, wherein the distance is derived from a vector representation in a color space of a pixel of the input image and a corresponding pixel from a clean background image.

23. The computer-readable medium of claim 21, wherein the distance is derived from a vector representation in a color space of a pixel of the input image and a corresponding pixel from a clean background image, and wherein the distance comprises a brightness component and a color component.

24. The computer-readable medium of claim 21, wherein the probability of each pixel is determined via a probability density function applied to a brightness component and a color component of the distance.

25. The computer-readable medium of claim 21, wherein the probability of each pixel is calculated as a product of a brightness probability density function and a color probability density function.

* * * * *